(12) United States Patent
Gruenler et al.

(10) Patent No.: US 10,497,174 B2
(45) Date of Patent: Dec. 3, 2019

(54) METHOD AND DEVICE FOR AUGMENTED DEPICTION

(71) Applicant: Daimler AG, Stuttgart (DE)

(72) Inventors: Christian Gruenler, Ergenzingen (DE);
Wilhelm Wilke, Dornstadt (DE);
Tobias Tropper, Filderstadt (DE);
Adam Schatton, Esslingen (DE);
Markus Hammori, Deufringen (DE);
Lars Luetze, Esslingen (DE); Marc Necker, Weil der Stadt (DE); Dirk Olszewski, Paderborn (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 15/026,196

(22) PCT Filed: Sep. 13, 2014

(86) PCT No.: PCT/EP2014/002485
§ 371 (c)(1),
(2) Date: Mar. 30, 2016

(87) PCT Pub. No.: WO2015/049029
PCT Pub. Date: Apr. 9, 2015

(65) Prior Publication Data
US 2016/0240012 A1 Aug. 18, 2016

(30) Foreign Application Priority Data
Oct. 1, 2013 (DE) .................. 10 2013 016 244

(51) Int. Cl.
*G06T 19/00* (2011.01)
*G06K 9/00* (2006.01)
(Continued)

(52) U.S. Cl.
CPC ............. *G06T 19/006* (2013.01); *B60R 1/00* (2013.01); *G01C 21/3602* (2013.01);
(Continued)

(58) Field of Classification Search
CPC .... G06T 19/006; B60R 1/00; B60R 2300/305
See application file for complete search history.

(56) References Cited

U.S. PATENT DOCUMENTS 9,310,218 B2 * 4/2016 Choi .................. G01C 21/3679
2010/0023257 A1 1/2010 Machino
(Continued)

FOREIGN PATENT DOCUMENTS

| CN | 102782739 A | 11/2012 |
| CN | 103189227 A | 7/2013 |
| DE | 10 2011 115 739 A1 | 4/2013 |

OTHER PUBLICATIONS

PCT/EP2014/002485, International Search Report (PCT/ISA/206, PCT/ISA/220 and PCT/ISA/210) dated Mar. 2, 2015, with partial English translation, enclosing Written Opinion of the International Searching Authority (PCT/ISA/237) (Thirty One (31) pages).
(Continued)

*Primary Examiner* — Samantha (Yuehan) Wang
(74) *Attorney, Agent, or Firm* — Crowell & Moring LLP

(57) ABSTRACT

A method for augmented depiction of at least one piece of additional information in at least one image of a surrounding environment, in particular a vehicle surrounding environment, is disclosed. The image forms a background of a display, where several pieces of additional information to be depicted are compiled into at least one group and are output as a piece of group information in the background.

7 Claims, 5 Drawing Sheets

(51) Int. Cl.
  *G01C 21/36* (2006.01)
  *B60R 1/00* (2006.01)
  *H04N 7/18* (2006.01)

(52) U.S. Cl.
  CPC ....... *G01C 21/365* (2013.01); *G01C 21/3638* (2013.01); *G01C 21/3647* (2013.01); *G01C 21/3679* (2013.01); *G01C 21/3697* (2013.01); *G06K 9/00671* (2013.01); *G06K 9/00791* (2013.01); *H04N 7/18* (2013.01); *B60R 2300/205* (2013.01); *B60R 2300/305* (2013.01); *B60R 2300/308* (2013.01)

(56) References Cited

U.S. PATENT DOCUMENTS

| | | | |
|---|---|---|---|
| 2011/0265023 A1* | 10/2011 | Loomis | G06F 3/04812 |
| | | | 715/771 |
| 2012/0075341 A1* | 3/2012 | Sandberg | G06F 17/30855 |
| | | | 345/633 |
| 2013/0093787 A1 | 4/2013 | Fulks et al. | |
| 2013/0138343 A1 | 5/2013 | Choi | |

OTHER PUBLICATIONS

Chinese Office Action issued in Chinese counterpart application No. 201480054235.7 dated Nov. 28, 2017, with partial English translation (Eleven (11) pages).

Chinese Office Action issued in Chinese counterpart application No. 201480054235.7 dated Nov. 9, 2018 (Seven (7) pages).

* cited by examiner

METHOD AND DEVICE FOR AUGMENTED DEPICTION

BACKGROUND AND SUMMARY OF THE INVENTION

The invention relates to a method for augmented depiction of at least one piece of additional information in at least one image of a surrounding environment, in particular a vehicle surrounding environment. Furthermore, the invention relates to a device for the implementation of the method.

Devices for augmented depiction superimpose a generated piece of additional information with a recorded and perceptible surrounding environment. The pieces of additional information are thereby depicted in the correct position in the images of the surrounding environment, wherein the images of the surrounding environment are output in the background. Such devices are, for example, partially transparent display units such as a HUP display unit (HUP=Head Up Display), a HMD display unit (HMD=Head Mounted Display), or opaque display units, for example a conventional screen.

Such a device for augmented depiction is, for example, known from DE 10 2011 115 739 A1.

The object of the invention is to specify an improved method and an improved device for augmented depiction of at least one piece of additional information.

In the method according to the invention for augmented depiction of at least one piece of additional information in at least one image of a surrounding environment, in particular a vehicle surrounding environment of a vehicle, the image forms a background of a display, wherein several pieces of additional information to be displayed are combined into at least one group and are output to be superimposed in the background as a piece of group information.

The invention enables a continuous adaptation of the overlaying of virtual pieces of additional information. In particular, a quickly recognizable allocation of virtual pieces of additional information to real objects in the real surrounding environment is enabled, in particular in dynamic scenes, such as video sequences, which are recorded during a drive with the personal vehicle and are output on a display. Furthermore, the vehicle enables intuitive interactions with the grouped virtual pieces of additional information for recognition of the content of all or only relevant or selected pieces of additional information by an observer.

The invention is applicable in the vehicle for detection and depiction of a vehicle surrounding environment. Additionally, the invention is also applicable for mobile devices, such as a mobile telephone, smart glasses and/or for virtual displays such as a projection screen and for further purposes, such as advertising, pedestrian navigation or for displays in means of transport, such as a bus, train, plane and ship. An adaptation of the superimposed pieces of additional information occurs here depending on the background and/or depending on an event and/or situation.

In a development, several pieces of additional information to be depicted are output as a piece of group information in such a. way that the individual pieces of additional information are output one over the other and partially or completely cover one another. By manual or event-controlled selection of an uncovered region of a covered piece of additional information, this can be output in the foreground as a first piece of additional information. For example, previously covered pieces of additional information can be output in the foreground upon reaching the associated real object in an event-controlled manner and/or depending on distance, in particular pieces of additional information from nearby real objects, and/or depending on a predetermined relevance and/or a priority. Therefore, a ranking or priority sequence is possible in the depiction of several pieces of additional information, wherein the ranking or priority sequence is able to be predetermined manually or in an event controlled manner and/or depending on the situation.

Alternatively or additionally, pieces of additional information to be depicted in the future can be compiled into a first group and output as a first piece of group information. Therefore, for example, objects lying at a great distance from the reference point, in particular from the current position of the personal vehicle, are compiled into a first group. With the approach of the personal vehicle, these grouped pieces of additional information are then able to be read completely by the personal vehicle, in particular on reaching the real positions thereof, and for example are output separately in the background one next to the other and/or one over the other.

Furthermore, it is provided that alternatively or additionally, pieces of additional information to be depicted currently are compiled into a second group and output as a second piece of group information. This gives the observer the opportunity, for better clarity of the display, for example, to only output those virtual pieces of information which are lying ahead in time and/or location and therefore lie in the future. The virtual pieces of additional information to be depicted currently are compiled and output, for the reduction of the density of information in the display, to lie partially or completely one over the other in the piece of group information.

Furthermore, it is possible that previous virtual pieces of information, for example depicted in the past, are compiled into a third group and are output as a third piece of group information. The observer can hereby, when needed, obtain a review of the virtual pieces of information depicted in the past by a simple selection of the third piece of group information.

In one development, the pieces of additional information of at least one of the groups are compiled in a sorted manner according to the distances thereof from the position of an observer of the display, in particular from the position of the personal vehicle, and/or according to the associated display duration in the background on the display and are output as a relevant piece of group information. Therefore, the pieces of additional information belonging to a group can be compiled in a sorted manner according to the distance from the reference point, for example the personal vehicle, and if necessary output such that the output of the pieces of additional information occurs in a sequentially correct manner.

The invention additionally enables a dynamic interaction with the display, by the piece of additional information being output in the background being able to be manipulated manually by means of at least one selection function and the output thereof in the background being able to be changed or adapted accordingly. In particular, the output and/or the manipulation of the piece of additional information to be output can occur by means of a voice-, image- and/or button-controlled function.

In one possible embodiment, the piece of additional information is output as an additional object and/or an additional text, wherein at least one of the additional objects is generated as a virtual road sign with or without reference (contextual reference) to the depicted surrounding environment. In particular during application of the invention in a display of a vehicle, the current position of the personal vehicle serves as a reference point.

Furthermore, it can be provided that the additional piece of information is output in particular in an event-controlled manner and if necessary alternately as a 2D depiction and/or as a 3D depiction. Therefore, for example, a piece of additional information output as an additional object, for example a virtual road sign, can, for example, be overlaid in the background in a 3D depiction and/or a piece of additional information output as an additional text, in particular a labelling of a real or virtual object in the output image, can be overlaid in the background in a 2D depiction. This increases the clarity of the display and enables an improved perception and ability to recognize relevant information in the background.

With regard to the device for the implementation of a method, this comprises at least one recording unit to record and detect an image of a surrounding environment which forms a background of a display; at least one processing unit for graphic processing of a recorded digital image and transformation of the digital image into an output image as well as to generate and superimpose at least one piece of additional information into the background; and at least one output unit to output the piece of additional information into the background.

The recording unit is, in particular, one or more cameras, in particular a stereo camera system, an omnidirectional camera, an infra-red camera, a laser-scan unit, a radar, a lidar or a combination of comparable detection units. The processing unit can be integrated. into the recording unit or can be formed separately. The processing unit can be an integrated switch or a control device or another suitable image processing unit, The output unit can be a classic screen, a HUP display unit (HUP=Head Up Display), a MMD display unit (HMD=Head Mounted Display) or another suitable display unit.

In a further method according to the invention for augmented depiction of at least one piece of additional information in at least one recorded digital image of a surrounding environment of a vehicle:
the recorded digital images;
the associated detection time and
at least as a vehicle parameter, an associated current position of the vehicle
are stored in an event-controlled manner, wherein the storage of the digital images occurs in a limited manner in terms of location and/or time, depending on the detected event and the recorded digital images, and/or wherein the stored digital images of at least one event are output on a display as an output image.

The advantages achieved with the invention in particular consist in that an intuitive perception of the relationship between the real surrounding environment and the virtual pieces of additional information, and in particular better clarity due to the compilation of several virtual pieces of additional information to be depicted into pieces of group information, are enabled. Additionally, a sequentially correct and therefore chronological depiction of virtual pieces of additional information is enabled in the display. Furthermore, the display can be adapted according to an event and/or situation and pieces of additional information regarding a certain event can be output separately.

During application of the method for augmented depiction in a vehicle, the virtual pieces of additional information correspond directly to the surroundings of the vehicle surrounding environment which are visible to the driver, wherein the "reduced" augmented depiction of the pieces of additional information according to the invention, such as additional objects/additional text, occurs by compilation of several pieces of additional information into sorted groups. Pieces of additional information that are to be depicted/are depicted can thereby be compiled into the following groups:
preview group (=first group): pieces of additional information, the display of which is imminent;
current group (=second group): pieces of additional information which are currently visible in the vehicle surrounding environment;
review group (=third group): pieces of additional information which were recently visible in the display.

The following sorting is possible within a group:
sorting of the pieces of additional information according to distance from the reference point, the vehicle;
sorting according to the dwell time of the pieces of additional information in the display.

For temporal and content interaction and manipulation of the output/imaging of the pieces of additional information in the output image of the surrounding environment, various functions, such as "stopping a currently output sequence of pieces of additional information and/or output images" (=stopping of the relevant video sequence), "rewinding", "piece of group/additional information" and "interior view" are offered to the passenger.

Exemplary embodiments of the invention are explained below in more detail by means of drawings.

DETAILED DESCRIPTION OF THE DRAWINGS

Figure 1A:
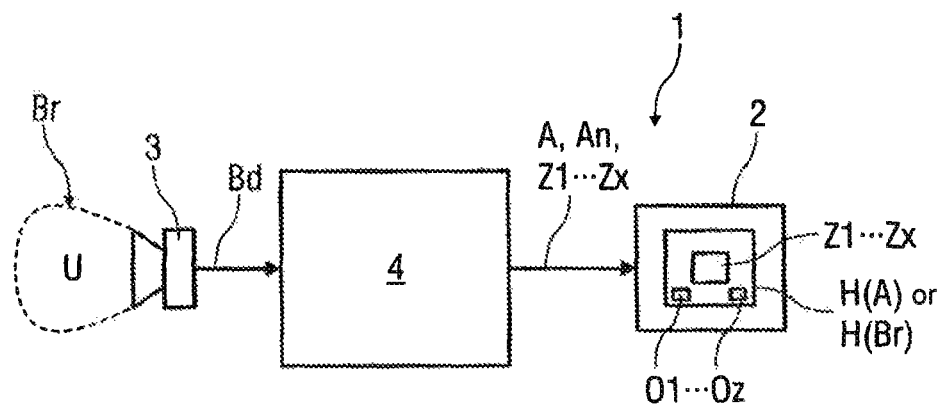
FIG. 1A schematically shows a device for augmented depiction of a piece of additional information in a background, FIG. 1B schematically shows a vehicle having several recording units, FIG. 2 schematically shows an exemplary embodiment of a background having superimposed 2D pieces of additional information which are positioned in the background with reference to or without reference to image objects, FIG. 3 schematically shows a further exemplary embodiment of a background having superimposed 2D pieces of additional information which are positioned in the background with reference to or without reference to image objects, wherein at least two output pieces of additional information are related to each other, FIG. 4 schematically shows a further exemplary embodiment of a background with grouped pieces of additional information, FIG. 5 schematically shows a further exemplary embodiment of a background with grouped and sequentially correct pieces of additional information, FIG. 6 schematically shows a further exemplary embodiment of a background having superimposed 2D and 3D pieces of additional information with interactive buttons in the display for the output of further pieces of additional information with regard to one of the selected pieces of additional information, FIG. 7 schematically shows a further exemplary embodiment of a background having superimposed 2D and 3D pieces of additional information with interactive buttons in the display for the output of further pieces of additional information with regard to one of the selected pieces of additional information, and FIG. 8 schematically shows a further exemplary embodiment of an output image depicting an event having superimposed 2D and 3D pieces of additional information.

Parts which correspond to one another are provided with the same reference numerals in all figures.

FIG. 1A shows, schematically, a device 1 for augmented depiction of at least one, in particular virtual piece of information Z1 to Zx in an image which forms a background H(A), H(Br) on an output unit 2.

The image can thereby be a real image Br of a surrounding environment U lying in the field of vision of the user or a digitally recorded image Bd of the surrounding environment U lying ahead.

In other words: the image Br forming the background H(Br) is, in one embodiment, the real surrounding environment U lying ahead. in an alternative embodiment, which is described here in more detail, a digital image Bd of the real surrounding environment U lying ahead is recorded as an image and is transformed into an output image A which forms the background H(A) on the output unit 2.

The device 1 comprises a recording unit 3 which continuously records digital images Bd of the environment U in the manner of a video sequence. The digital images Bd are supplied to a processing unit 4 for the processing and generation of an output image A resulting therefrom or a sequence of output images An. In this embodiment, the generated and output output image A forms the background H(A). Additionally, the processing unit 4 generates virtual pieces of additional information Z1 to Zx which are overlaid in the background H(A) or H(Br) in a superimposed manner.

Figure 1B:
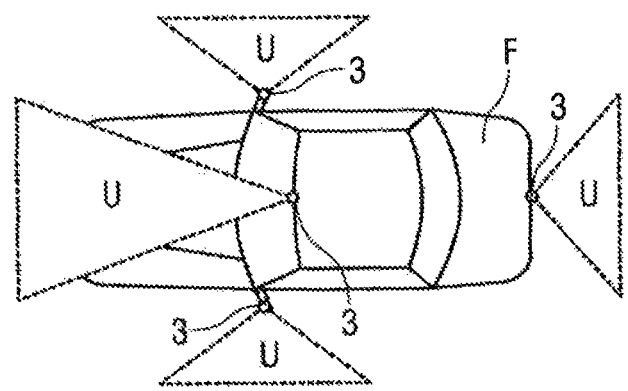

The device 1 is, for example, integrated into a vehicle F depicted in FIG. 1B and there serves for the detection of the surrounding environment U of the vehicle F, in particular the detection of a vehicle surrounding environment lying ahead in the driving direction. The vehicle F comprises, for example, at least one vehicle-integrated camera as a recording unit 3 (or a radar unit, an ultrasound sensor unit, a lidar unit), which is arranged at least in the front region. Additionally, the vehicle F, as depicted in FIG. 1B, can comprise further recording units 3, for example integrated into side mirrors and/or in the rear region of the vehicle F.

The recording unit 3 is thereby executed in such a way that these two or multi-dimensional digital images Bd record with or without depth information of the surrounding environment U.

The processing unit 4 is, in particular, a separate control device and/or an image processing unit which can be integrated into another control device and/or driver assistance system.

The output unit 2 is, in particular, a display in the form of a screen in the fittings region and/or in the form of a projection screen in the windscreen region. In the case of formation of the output unit 2 as a screen, the generated digital output image A is output in the background H(A), in which digital output image the virtual pieces of additional information Z1 to Zx are overlaid. In the case of the formation of the output unit 2 as a projection screen or head up display, the real surrounding environment U lying ahead forms the background H(Br) on which the virtual pieces of additional information Z1 to Zx are overlaid. The output unit 2 is referred to below as display 2.

The device 1, in particular the processing unit 4, is formed in such a way that the recorded digital image Bd of the surrounding environment U is transformed into an output image A of the display 2 as a background H(A), wherein the piece of additional information Z1 to Zx can be output depending on the associated background region of the output image A and therefore to be superimposed in this in a changed/adapted manner.

This means this can appear in an visually emphasized manner in the output image A and therefore in front of the background H(A) by simple adaptation or changing of the virtual piece of additional information Z1 to Zx to be overlaid.

Figure 2:
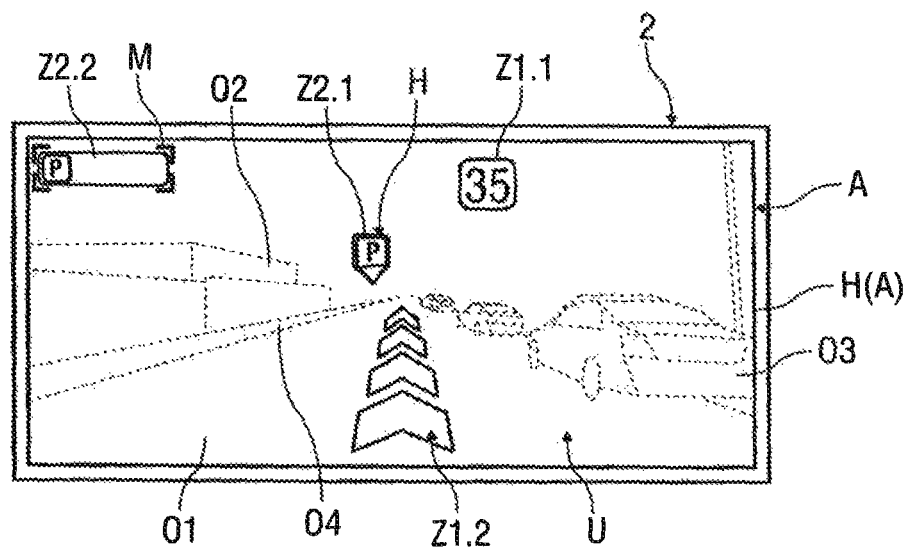

FIG. 2 shows a possible exemplary embodiment in which an output image A is generated and output on the display 2 as a background image by means of the digital image Bd of a surrounding environment U which, for example, is recorded as a color image. The output image A forming the background H(A) and the real objects O1 to Oz thereof are shown in FIG. 2 by a thin dotted line depiction.

The output image A here shows a surrounding environment U lying ahead of the personal vehicle F. The detected digital image Bd of this surrounding environment U was, for example, recorded as a 24-bit three-channel (RGB—red, green, blue) color image, each pixel having a RGB value, or as an infra-red image in a wave region which is not perceptible for humans.

To support the observer, in particular a driver or passenger, additional pieces of information can be overlaid as virtual pieces of additional information Z1 to Zx, concerning desired or relevant objects O1 to Oz, the pieces of additional information being overlaid in the output image A relative to the respective associated real object O1 to Oz in the correct position and in a perspectively correct manner, only in the correct position, in an analogous direction and/or independently and therefore free of the background H(A) (the output image A or the translucent surrounding environment U (=H(Br)).

In other words: The digital output image A, representing the surrounding reality, is superimposed with additional digital pieces of information—the virtual pieces of additional information Z1 to Zx—wherein the superimposing in the output image A occurs in a perspectively correct manner to the real objects O1 to Oz. The virtual pieces of additional information Z1 to Zx thereby correspond directly to the real objects O1 to Oz in the real surrounding environment U.

In the described exemplary embodiment n an application in the vehicle F, the output image A of the surrounding environment U is moved with the driving of the personal vehicle F. For this purpose, a sequence of output images A in the form of a video sequence of the digital images Bd recorded in the surrounding environment U is generated. Due to the correspondence of virtual pieces of additional information Z1 to Zx and with regard to one or several real objects O1 to Oz in the surrounding environment U, in one development, the position and/or shape of the virtual piece of additional information Z1 to Zx can be continuously adapted.

For example, pieces of additional information Z1.1 and Z1.2 represent the object O1 and the street lying ahead on which the personal vehicle F drives, The 2D piece of additional information Z1.1 is an informative text which represents a house number. The real object O2 is a car park. The associated piece of additional information Z2.1 represents the correct location in the surrounding environment U. For this purpose, the piece of additional information Z2.1 comprises at least one directional indicator H in the form of an arrow which displays where the car park lies in the real surrounding environment U. The associated textual piece of additional information Z2.2 specifies the address, for example. The object O3 represents parked cars and the object O4 a road boundary.

The 3D piece of additional information Z1.2 is output as an, in particular, changing directional arrow which specifies the driving direction of the personal vehicle F on the associated identified object O1, the street.

With regard to the object O2—the car park—correspondingly two pieces of additional information Z2.1 and Z2.2 are generated and output in the output image A. The object 2 in reality is therefore augmented with two virtual pieces of additional information Z2.1, Z2.2.

One of the pieces of additional information Z2.1, in particular an additional object in the form of a car park symbol, is placed in the position in the output image A at which the real object O2 is located in the output image A. The size of this virtual piece of additional information Z2.1 is proportional to the distance of the real object O2 such that its size changes continuously in the case of a driving vehicle F. The real object O2—the car park is displayed in a perspectively correct manner.

A further virtual piece of additional information Z2.2 in the form of an additional text contains a description of the real object O2. This additional information Z2.2 is output without a location reference to the object O2 and therefore free in an image region of the output image A. Additionally, this piece of additional information Z2.2 and its position is not continuously adapted, but has a constant shape, dimensions and/or position in the output image A. The text contained therein is able to be read easily.

Additionally, according to FIG. 2, further pieces of additional information Z1 and Z3, which are related to the personal vehicle F and/or to the object O1, are positioned accordingly.

The virtual piece of additional information Z1.1 as an additional text thereby represents a house number along the street. This piece of additional information Z1.1 can be output in a dedicated image region of the output image A having a fixed position, wherein the value can be adapted continuously to the current vehicle position. The further virtual piece of additional information Z1.2 which is related to the personal vehicle F and to the object O1, the street, is formed as an additional object and represents the route expected to be travelled (straight-line drive) of the personal vehicle F on the object O1. This virtual piece of additional information Z1.2 is continuously adapted, at least in shape, size and if necessary also in color, to a determined location lying ahead and/or event and/or to the route lying ahead.

In FIG. 2, for example, a road boundary (=object O4) and laterally parked vehicles (=object O3) are depicted as further objects O3 and O4. These can likewise be linked with associated virtual pieces of additional information Zx.

As shown in FIG. 2, several pieces of additional information Z1 to Zx are depicted in an augmented manner in the surrounding environment U of the output image A at the same time. Some of the pieces of additional information Z1 to Zx (for example Z2.1 in FIG. 2) can be output in a perspectively correct manner and therefore with location reference to the relevant real object O1 to Oz, and others (for example Z2.2 in FIG. 2) can be output without reference to reality at a free position in the output image A.

Additionally, the freely positioned pieces of additional information Z1 to Zx which are related to the objects O1 to Oz in another regard, for example informatively, and therefore descriptively or temporally, can be output in a manner which describes the relationship by means of another type of depiction. Therefore, for example, the free or depositioned piece of additional information Z2.2 of the object O2 is provided with a marking M, for example a partial frame. The marking M thereby occurs in another color and/or in another color spectrum to the output of the piece of additional information Z2.2 such that these differ from one another with regard to color. The output of the marking M can be controlled thereby in such a way that the marking M is output only upon selection of the allocated object O2 and therefore the relevant piece of additional information Z2.2 is emphasized in the output image A by means of the additionally overlaid marking M.

If several pieces of additional information Z1 to Zx are augmented at the same time in the output image A, for example only one real object O2 and the associated pieces of additional information Z2.1 and Z2.2 thereof can be selected and, correspondingly, the associated markings M thereof are output.

Figure 3:
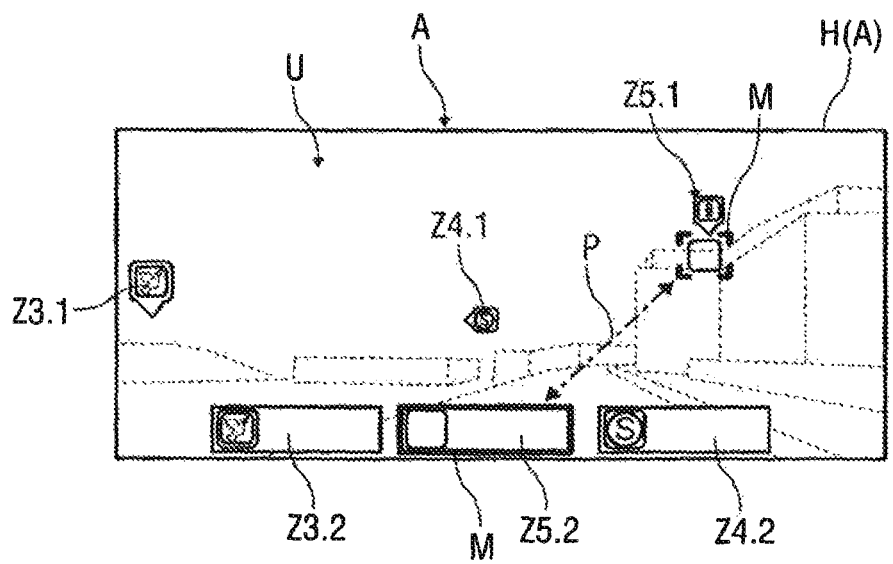

FIG. 3 shows a further exemplary embodiment for an output image A having several augmented pieces of additional information Z3.1 to Z5.1, wherein the pieces of additional information Z3.1, Z4.1 and Z5.1 output as an additional object, in particular a symbol, are output in the output image A in a perspectively correct manner and with a location reference to an associated object in the surrounding environment which is not recognizable in the output image A. A further piece of additional information Z3.2 to Z5.2 is allocated to each of these pieces of additional information Z3.1 to Z5.1 and therefore to each relevant object which is not recognizable in the output image A, the piece of additional information being output without location reference, freely in the space of the output image A, preferably in the free edge region of the output image A for the better clarity.

In a development it is provided that, upon selection of one of the real objects which is not recognizable in the output image A, the associated pieces of additional information Z3.1, Z3.2 or Z4.1, Z4.2 or Z5.1, Z5.2 thereof are provided with markings M.

In the exemplary embodiment according to FIG. 3, the real object O1 to Oz allocated to the pieces of additional information Z5.1 and Z5.2 was selected such that the pieces of additional information Z5.1 to Z5.2 which are related to one another are output in an emphasized manner by means of a frame-shaped marking M. The relationship of the piece of additional information Z5.1 to Z5.2 is indicated in FIG. 3 by means of an arrow P which is not output in the output image A. The markings M of the selected pieces of additional information Z5.1 to Z5.2 can thereby be output to be the same or different in shape, color and/or size.

Figure 4:
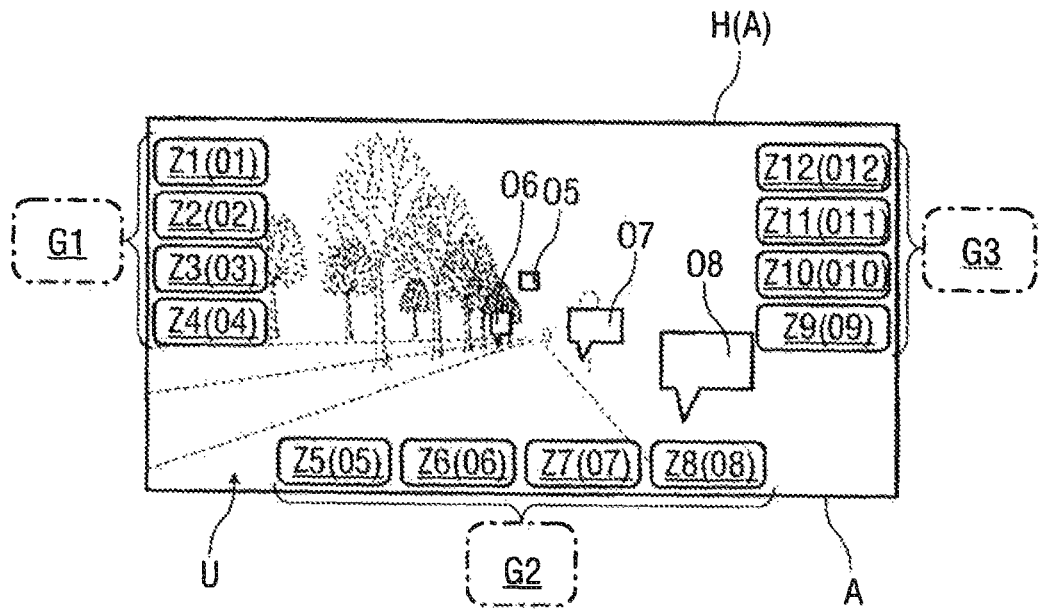
Figure 5:
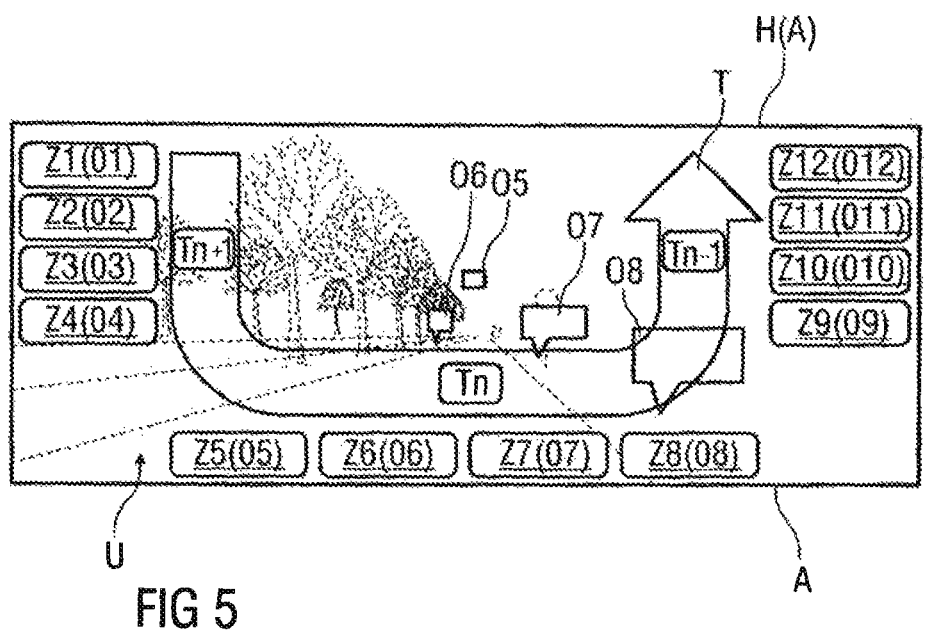

FIGS. 4 and 5 show, schematically, further exemplary embodiments of an output image A having grouped pieces of additional information Z1 to Z12 which are output in a sequentially correct manner.

These virtual pieces of additional information Z1 to Z12 are thereby output in the output image A without location reference to the current reality and surrounding environment U, although these have an object reference to at least one real object O1 to O12 in the surrounding environment U.

For an improved clarity of the display 2, it is therefore provided to group these object-related pieces of additional information Z1(O1) to Z12(O12) and to output them in a compiled manner.

For example, for this purpose, the pieces of additional information Z1 to Z9 are compiled by means of the processing unit 4 into the following groups G1 to G3 and are output in a grouped manner:

first group G1=preview group: compilation and output of pieces of additional information Z1 to Z4, the associated real objects O1 to O4 of which lie ahead in the surrounding environment U and therefore shall be displayed in the future (i.e.: the display thereof is imminent); the output of these pieces of additional information Z1 to Z4 of the first group G1 thereby occurs in a first edge region of the output image A, wherein the pieces of additional information Z1 to Z4 can be output one next to the other (as depicted) or one over the other in a partially or completely superimposed manner, as a piece of group information (not depicted);

second group G2=display group: compilation and output of pieces of additional information Z5 to Z8, the associated real objects O5 to O8 of which lie in the direct surrounding environment U of the vehicle F and therefore are displayed currently in the output image A (i.e.: the objects are visible); the output of these pieces of additional information Z5 to Z8 of the second group G2 thereby occurs in a second edge region of the output image A, wherein the pieces of additional information Z5 to Z8 can be output one next to the other (as depicted) or one over the other in a partially or completely superimposed manner, as a piece of group information (not depicted);

third group G3=review group; compilation and output of pieces of additional information Z9 to Z12, the associated real objects O9 to O12 of which lie behind in the real surrounding environment U and therefore were displayed in the past (i.e.: which were recently visible); the output of these pieces of additional information Z9 to Z12 of the third group G3 thereby occurs in a third edge region of the output image A, wherein the pieces of additional information Z9 to Z12 can be output one next to the other (as depicted) or one over the other in a partially or completely superimposed manner, as a piece of group information (not depicted).

Additionally, the pieces of additional information Z1 to Z12 can be sorted within the respective groups G1 to G3. The sorting algorithm can be configured. The following options are possible: sorting of the pieces of additional information Z1 to Z12 according to the distance from the vehicle F and/or according to the dwell time thereof in the output image A.

In the first group G1, the "preview group", the pieces of additional information Z1 to Z4 can additionally be arranged according to the sorting such that the piece of additional information Z1 of the real object O1 to Oz which is furthest away and which therefore shall soon be brought to the display, is arranged on top.

In the third group G3, the "review group", the pieces of additional information Z9 to Z12, for example, are arranged according to the sorting such that the piece of additional information Z12 of the object O1 to Oz which is furthest away and which has already been displayed but is no longer visible, is arranged on top.

The currently visible pieces of additional information Z5 to Z8 are arranged according to the sorting, for example, from left to right.

The piece of additional information Z5 of the object O5 which is furthest away is placed on the left in the second group G2. The piece of additional information Z8 of the object O8 having the shortest distance from the vehicle F is arranged on the right in the second group G2.

The chronological and therefore sequentially correct course T of the display 2 of the associated objects O1 to O12 of the permanently depicted pieces of additional information Z1 to Z12 is illustrated by this arrangement, as is clarified in FIG. 5 by means of the arrow P for the course T.

As is described above, a real object O2 to O5 can be illustrated by two virtual pieces of additional information Z2.1, Z2.2 to Z5.1, Z5.2. The virtual pieces of additional information Zx.1, which are placed in a perspectively correct manner in the output image A, do not allow an ordered output. However, the virtual pieces of additional information Zx.2 without correspondence to reality and location reference enable an ordered positioning in the output image A. Due to the grouping of pieces of additional information Zx.2 without location reference and the sorting of pieces of additional information Zx.2 in the groups G1 to G3, it is possible to select and to output a certain piece of additional information Zx.2 in a targeted manner with simple commands.

At least one of these pieces of additional information Zx.2 or Z1 to Z12 can be selected in a group G1 to G3 with simple commands such as "right", "left", "up", "down". Further commands can be executed for a selected piece of additional information Zx.1 or Z1 to Z12, for example a further piece of additional information Z can be called up and output.

The interaction with these can be implemented by a reduced number of commands due to the grouped arrangement of the pieces of additional information Z1 to Z12. Due to the reduced number of commands, the interaction with the pieces of additional information Z1 to Z12 can be implemented using a gesture control or voice command.

For example, the augmented output image A of the reality and therefore the reproduction of the surrounding environment U (=background H(A)) can be stopped by means of a "stop" function of the processing unit 4. The pieces of additional information Z1 to Z12 are furthermore output such that an interaction with the virtual pieces of additional information Z1 to Z12 is possible. The depicted surrounding environment U can be explored using this function, depending on the vehicle movement in the output image A.

Using a further active "rewind" function of the processing unit 4, the augmented field of vision and therefore the output image A is reversed along the already driven route. The output image A of the real surrounding environment U is, for this purpose, continuously stored and coupled to the vehicle positional data of a navigation system. After the field of vision has been reversed to an already travelled position, the corresponding output image A of the real surrounding environment U is augmented with the previously output, associated virtual pieces of additional information Z9 to Z12.

Additionally, it is provided that each piece of additional information Z1 to Zx can provide, in particular call up and output, a further piece of additional information.

Figure 6:
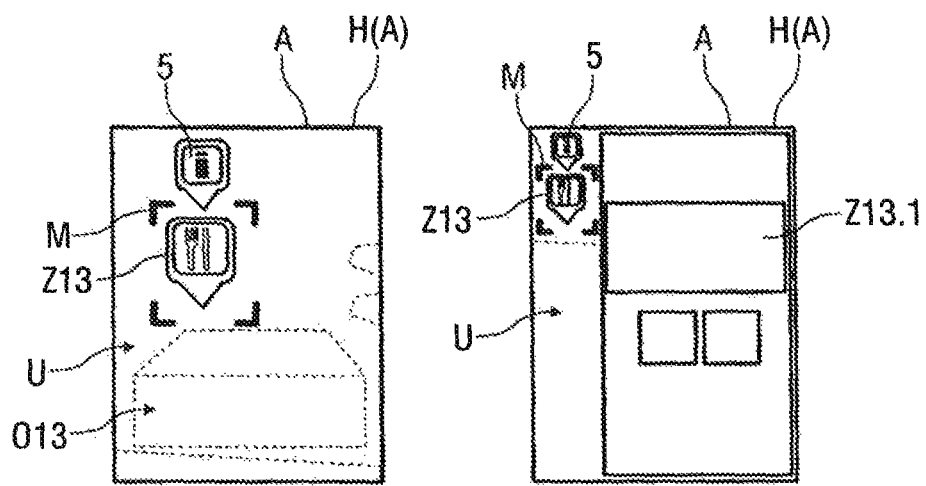

FIG. 6 shows an exemplary embodiment, wherein a piece of additional information Z13 is expanded by a button 5 in the output image A which indicates that a further piece of additional information Z13.1 regarding the associated object O13 is stored for this piece of additional information Z13. The further piece of additional information Z13.3 is overlaid in a superimposed manner in the output image A by the activation of the button 5 by means of voice control, operating control or automatically in the case of the occurrence of a predetermined event. The activation of the button 5 can thereby be displayed by a frame-shaped marking M of the associated piece of additional information Z13.

Figure 7:
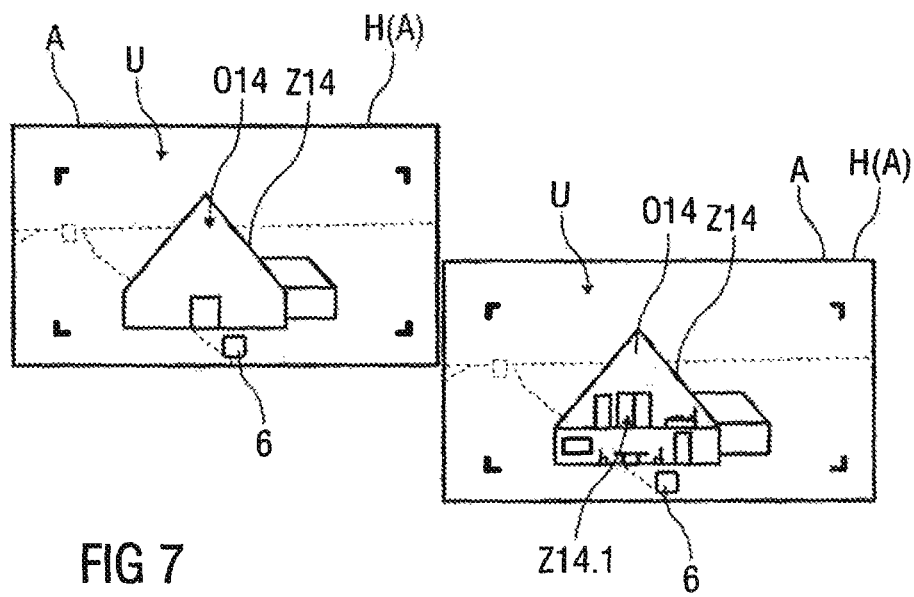

FIG. 7 shows a further embodiment of the invention in which, for a virtual piece of additional information Z14, for example an image of a real object O14, for example of a building in the surrounding environment U, an interior view is overlaid in a superimposed manner as a further piece of additional information Z14.1. If the associated object O14 and/or the associated virtual general piece of additional information Z14 is selected, for which, for example, an interior view is stored, then the depiction of this object O14 or of this piece of additional information Z14 is expanded by a button 6 which indicates that an interior view (further piece of additional information Z14.1) can be displayed for this object O14. By activating this button 6, the augmentation of the object O14 changes from the piece of additional information Z14 representing the exterior view into the further piece of additional information Z14.1 representing the interior view. The virtual interior view is depicted in a perspectively correct manner and therefore superimposes the real object O14.

The insight into the object interior can, for example, be determined with a so-called "clipping plane" method. This plane runs over the virtual object. All points of the virtual model which are located between the vehicle F and the "clipping plane" are not displayed. The "clipping plane" is always aligned in the direction of the vehicle F such that, in the case of a driving vehicle F, the interior view is continuously adapted.

If the button 6 for the interior view is actuated again, the output image A and the overlaid further piece of additional information Z14.1 is stopped so that a more accurate observation is possible. The interior view can thereby be enlarged. Parts of the model can contain further pieces of additional information. Objects Oz having further pieces of additional information Zx.1 are expanded by a button 5, 6 in the still image, in the case of the actuation of which, the further pieces of information Zx are displayed.

According to a development of the invention, it can occur during driving with the vehicle F that the driver passes a road sign and does not perceive this correctly. In this situation it is helpful for the driver if he has the opportunity to be able to display the road sign on the display 2 of the vehicle F again.

It can also occur that a speed limit assistant integrated into the vehicle F recognizes a speed limit which the driver has not perceived. It is also helpful for the driver in this case if the vehicle F displays the road sign which it has recognized to the driver in a photo or video of the entire scene. Therefore, the driver can decide himself whether the road sign is relevant to him.

Additionally in the case of speed limit assistants which autonomously carry out decisions to operate the vehicle F, detection and control errors can occur because, for example, a speed limit has been interpreted incorrectly, for example if it is not relevant for the lane in question, but for a turning lane. If the incorrectly detected speed limit is displayed to the driver in the display 2, then the driver presently does not have the opportunity to verify the overlaid speed limit.

Furthermore, it can be helpful for the driver to be able to observe other signs again, for example turn instructions.

According to the invention it is therefore provided that the device 1 is formed in such a way that images B recorded in the surrounding environment are stored depending on events and information relevant to this.

In particular, at least the recorded digital images Bd, an associated detection time and, at least as a vehicle parameter, an associated current position of the vehicle F, are stored in an event-controlled manner, wherein the storage of the digital images Bd occurs in a manner which is limited in terms of location and/or time, depending on the detected event and/or wherein the stored digital images Bd of at least one event are output as an output image A on the display 2.

For this purpose, for example, firstly, a quantity of events which can be recorded by the device 1 is defined. An event can, for example, be the recognition of a road sign in the real surrounding environment U. Additionally, any other events are conceivable, such as, for example, the occurrence of a warning message in the vehicle F or driving past a certain geographical marking.

The associated detection time at which the event occurred is determined for any event by the device 1, and this detection time is stored together with the images B of the event recorded thereby. Additionally, the geographical current position of the vehicle F at the detection time of the event can be stored.

It is obvious that additionally any further data concerning the event can be stored, such as, for example, the speed of the vehicle F, but also information concerning the rain intensity or the lighting situation.

Figure 8:
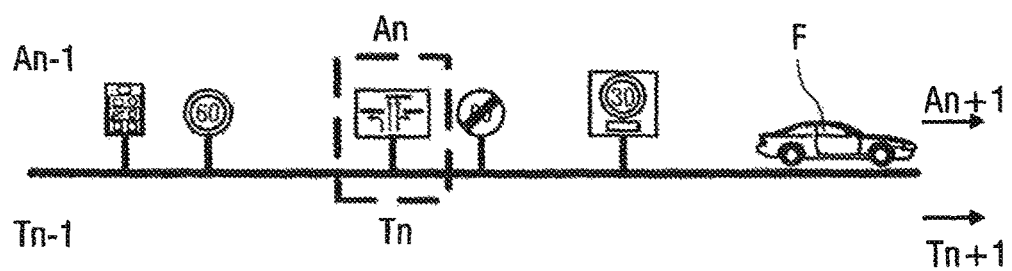

FIG. 8 shows, by way of example, an output image sequence An of several output images A and therefore an image of a visual recording of the surrounding environment U of the vehicle F by means of one of the recording units 3.

The device 1 is additionally formed in such a way that the predetermined events can be related to one another in terms of time and location and to the current point in time Tn on the display 2 by means of an operating unit, in particular a voice-, image- and/or button control in the vehicle F. This facilitates the driver to select a certain event.

For example, the events can be depicted on a navigation map in order to produce a location reference to the landscape. Furthermore, it is conceivable that the driver can filter out certain events with the aid of a filter function. It is also conceivable that the driver can search for certain events via a search function.

In FIG. 8, a crossing sign, which is detected at the point in time Tn in the past, i.e., one kilometer ago or one minute and thirty seconds ago, and which is overlaid in the preceding output image An-1, is provided as an event. In the case of a search for this predetermined event, the relevant object O1 to Oz and/or the piece of additional information Z1 to Zx is identified in the output image sequence An output on the display 2 by means of the device by means of the stored data and, for identification, the crossing sign is provided with a marking M for the search/selection.

Further embodiments of the invention are possible in which there is a temporal limit for the recording of digital images Bd and events such that images B and events which have reached a certain age are deleted. However, embodiments are also possible in which there is no temporal limit for the recording of digital images Bd and events.

Furthermore, embodiments are possible in which there is a location limit for the recording of digital images Bd with regard to the event thereof such that, for example, digital images Bd which are allocated, for example, to an event and are stored for this are deleted after a predetermined driven stretch from the event. Alternatively, it is possible that the digital images Bd recorded at an event are deleted from a certain distance of the vehicle F from the location of the event.

In one variant of the invention, all events together with the stored pieces of information, such as the recorded digital images Bd, the detection times and/or the detected vehicle positions, are transferred to a central server (back end server) and are stored there. The access to the events and the associated digital images Bd and the output images A resulting therefrom by the driver can then, for example, occur in a decentralized manner via. remote access, via a website or an application (app).

In detail, the method provides that, on occurrence of a certain event, a recording of the surrounding environment U is carried out, wherein the recording comprises at least the current time (detection time) or the current geographical position of the vehicle F on occurrence of the event. The recording thereby occurs in such a way that at least one still image of the surrounding environment U of the vehicle F at the point in time of the event is stored.

Additionally, additional pieces information which identify the event can be recorded, for example known speed limit, position of a road sign in the image of the surrounding environment and therefore in the output image A. Additional pieces of information which identify the state of the vehicle F at the point in time of the event, such as, for example, speed of the vehicle F, lane of the vehicle F, can also be recorded.

One development provides that additional metadata is recorded at the point in time of the event which can be relevant to the event, for example rain intensity, lighting conditions, road conditions.

Depending on the level of equipment of the vehicle F, in addition to the digital images Bd of the surrounding environment U recorded by means of radar or camera, at least one video of the surrounding environment U can be detected, which covers the point in time of the event.

For plausibility checking, furthermore one or more measurement values of other sensors of the vehicle F for detection of the surrounding environment can be recorded before, during or after the event. Therefore, for example, "radar still image", "radar video", "ultrasound still image", "ultrasound video", can be detected and stored in an event-controlled manner.

The invention enables a passenger of the vehicle F to select a previous event and the thereby recorded digital images Bd and generated output images A. By means of the selection of the event, at least one of the pieces of information recorded for the event, such as output images A with and/or without augmented pieces of additional information Z1 to Zx, can then be output on the display 2 or another suitable output medium. Additionally, the still image or video recorded for the event can be displayed on the display 2 by means of the selection of the event.

In an interactively formed display 2, images regions can thereby be marked within the still image or within the video which are relevant to the corresponding event, for example edges of a recognized road sign.

Additionally or alternatively, the predetermined events can be depicted on the display 2 in the output image A for an event selection either as text, as icons or in a combination of both ways. The events for the selection can thereby be related to one another in terms of time, in terms of location or in terms of time and location, wherein this relationship is visualized graphically or textually or in both ways, for example by means of arrows, clouds, groupings, boats, bars, etc.

In a possible manner which is not depicted in more detail, the predetermined events for selection can be grouped on a map or depicted individually. It can also be provided that on occurrence of an event, a report is displayed or made audible to the driver, wherein the report is perceptible for a certain period of time and the driver, if necessary, has the opportunity during this period of time to select the event directly by actuation of an operating element or by the execution of a voice command or by the execution of a gesture. It is also possible to execute comparable actions by the selection of the event, as has been described previously.

As already described above by means of the preview and review functions, the driver can run the display 2 of the output images A representing the events backwards or forwards analogously to this during the display of several events by means of an image sequence by actuation of an operating element or by the execution of a voice command or by the execution of a gesture, such that the respective event can be selected and displayed during output.

Furthermore, it is possible by means of the device 1, to transfer stored events and output images A and/or recorded digital images Bd of the events to a central server, for example a workshop, via a suitable communication connection, advantageously achieved via a wireless communication device integrated into the vehicle F, wherein the server stores the transferred data for a certain vehicle F at least for a limited time.

The invention and the method for augmented depiction are suitable for application for a mobile end device or a desktop PC, which produces a connection to a server and it enables a user to display the events for a certain vehicle F, to select them, and to display the data for this.

In order to reduce the stored quantity, it is provided that an event and the associated data, such as recorded digital images Bd and output images A, are deleted after a certain time from the occurrence of the event. In particular, an event and the data thereof is deleted as soon as the vehicle F has covered a certain stretch since the occurrence of the event or as soon as the vehicle F is located at a certain spatial distance from the event location.

Additionally, the method for event-controlled storage can automatically be triggered by means of an event which is recorded and identified by means of a vehicle sensor system, for example, detected predetermined road signs such as a stop sign, the recognition of a speed limit, the recognition of turn instructions.

The invention claimed is:

1. A method for augmented depiction of additional information in an image of a surrounding environment of a vehicle, comprising the steps of:
    compiling first pieces of additional information into a first group, wherein associated real objects of the first pieces of additional information lie ahead in the surrounding environment and are not currently displayed in the image but are to be displayed;
    compiling second pieces of additional information into a second group, wherein associated real objects of the second pieces of additional information are currently displayed in the image;
    compiling third pieces of additional information, wherein associated real objects of the third pieces of additional information were previously visible in the surrounding environment, into a third group; and
    outputting the first group as a first piece of group information and the third group as a third piece of group information in a superimposed manner in the image on a display without location reference to a current reality and the surrounding environment of the vehicle together with the second group as a second piece of group information, wherein the associated real objects of the second pieces of additional information are currently displayed in the image;
    wherein respective pieces of at least one of the first group, the second group, and the third group are compiled in a sorted manner according to distances thereof from a position of an observer of the display and/or according to an associated display duration in the image on the display;
    wherein the display is a screen or a projection screen or a head up display.

2. The method according to claim 1, wherein the first pieces of additional information are output such that individual pieces of the first pieces of additional information are output one over the other to partially or completely cover one another and/or one next to the other.

3. The method according to claim 1, wherein the first pieces of additional information output in the superimposed manner in the image are manipulated manually by a selection function.

4. The method according to claim 1, wherein the first pieces of additional information are additional objects and/or additional text.

5. A device for implementation of the method according to claim 1, comprising:
- a recording unit, wherein the recording unit records the image of the surrounding environment as a digital image;
- a processing unit, wherein the processing unit superimposes the first pieces of additional information, the second pieces of additional information, and the third pieces of additional information into the digital image; and
- a display, wherein the display displays the digital image and wherein the display is a screen or a projection screen or a head up display.

6. A method for augmented depiction of additional information in an image of a surrounding environment of a vehicle, comprising the steps of:
- compiling first pieces of additional information into a first group, wherein associated real objects of the first pieces of additional information lie ahead in the surrounding environment and are not currently displayed in the image but are to be displayed;
- compiling second pieces of additional information into a second group, wherein associated real objects of the second pieces of additional information are currently displayed in the image;
- compiling third pieces of additional information, wherein associated real objects of the third pieces of additional information were previously visible in the surrounding environment, into a third group; and
- outputting the first group as a first piece of group information and the third group as a third piece of group information in a superimposed manner in the image on a display without location reference to a current reality and the surrounding environment of the vehicle together with the second group as a second piece of group information, wherein the associated real objects of the second pieces of additional information are currently displayed in the image;
- wherein respective pieces of the first group, the second group, and the third group are compiled in a sorted manner according to distances thereof from a position of an observer of the display such that a chronological course of the respective pieces is depicted;
- wherein the display is a screen or a projection screen or a head up display.

7. A device for implementation of the method according to claim 6, comprising:
- a recording unit, wherein the recording unit records the image of the surrounding environment as a digital image;
- a processing unit, wherein the processing unit superimposes the first pieces of additional information, the second pieces of additional information, and the third pieces of additional information into the digital image; and
- a display, wherein the display displays the digital image and wherein the display is a screen or a projection screen or a head up display.

\* \* \* \* \*